April 1, 1969     R. E. WASSER     3,436,451
METHOD OF MAKING MOLDED CERAMIC ARTICLES
Filed June 29, 1966     Sheet 1 of 2
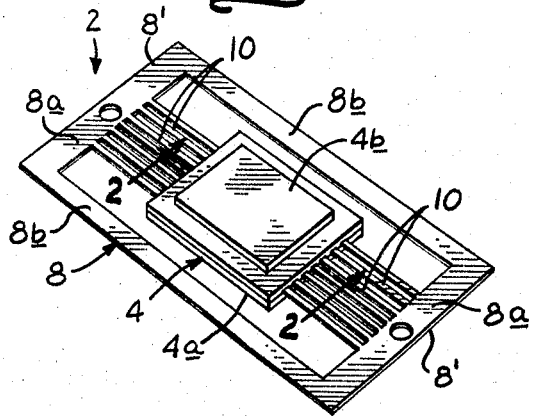
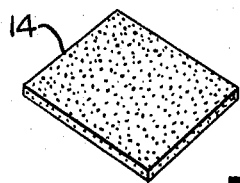
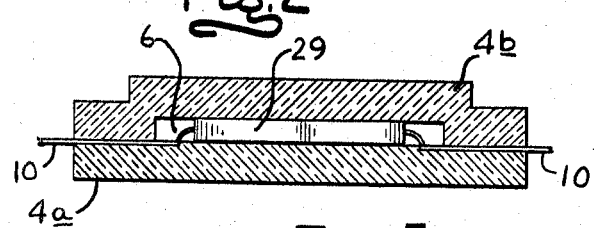
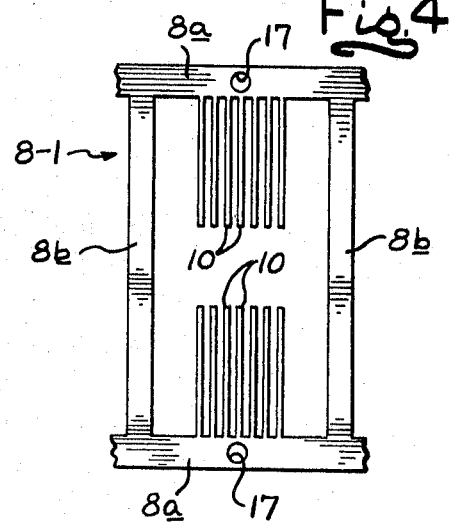
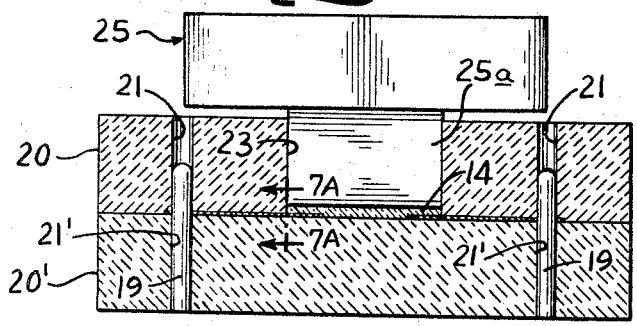
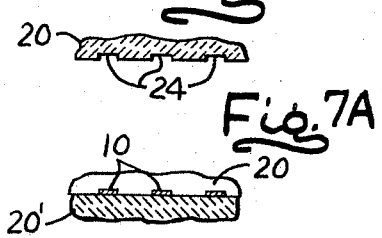
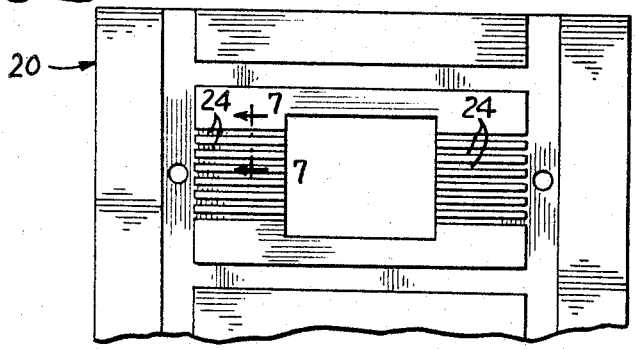
INVENTOR
ROBERT E. WASSER
by Wallenstein, Spangenberg, Hattis & Strampel
ATTYS.

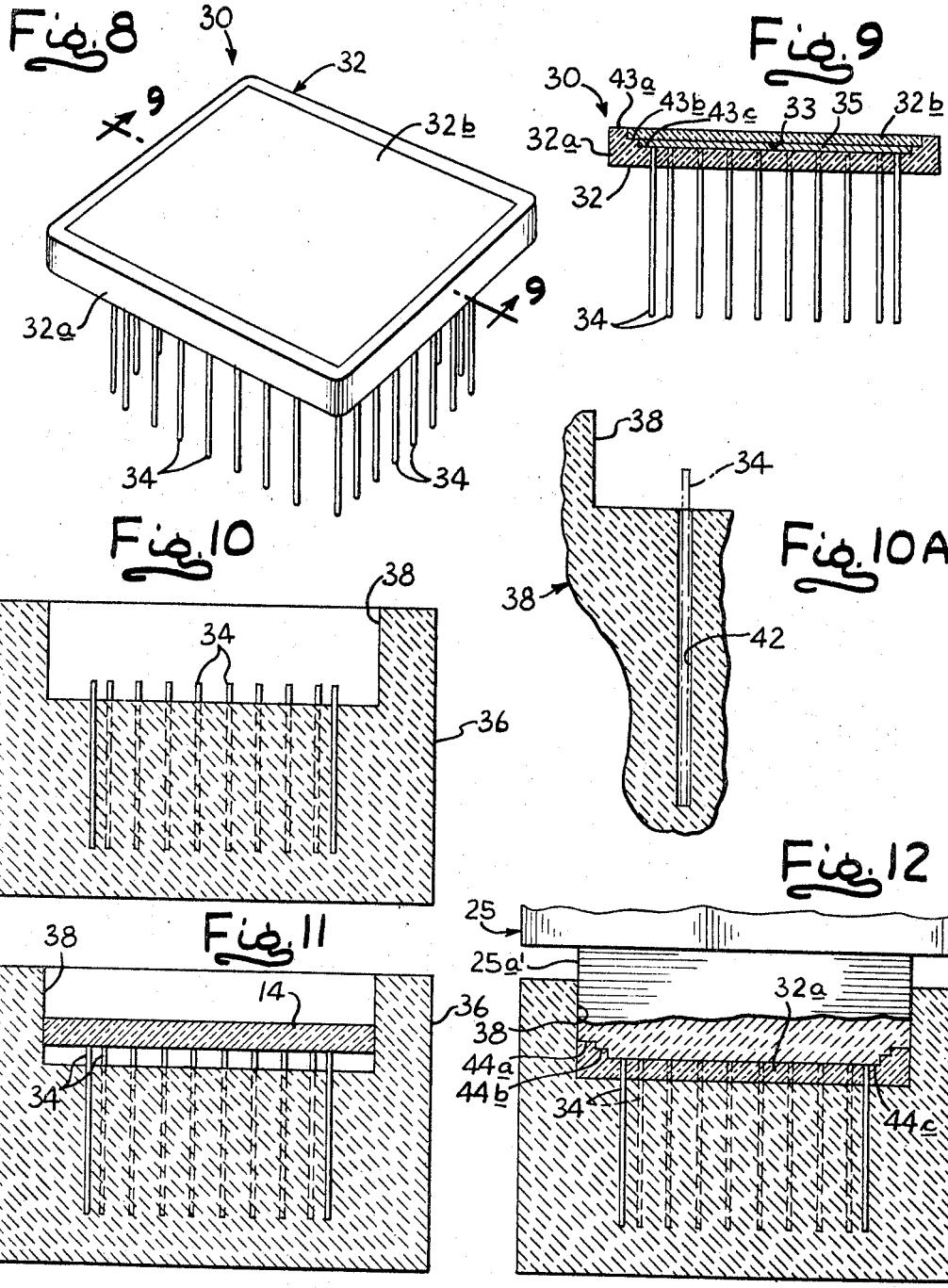

United States Patent Office 3,436,451
Patented Apr. 1, 1969

3,436,451
METHOD OF MAKING MOLDED CERAMIC ARTICLES
Robert E. Wasser, Orange, Calif., assignor to Servonic Instruments, Inc., Costa Mesa, Calif., a corporation of California
Continuation-in-part of application Ser. No. 456,330, May 17, 1965. This application June 29, 1966, Ser. No. 561,585
Int. Cl. C04b 35/60
U.S. Cl. 264—272    7 Claims

ABSTRACT OF THE DISCLOSURE

A method of making a molded ceramic body comprising the steps of: forming a mix of crystalline ceramic particles having a relatively high sintering and melting temperature and relatively low melting point non-crystalline particles convertible into a crystalline state when heated for a given time to a given temperature below the sintering and melting temperatures of the crystalline ceramic particles and above the melting temperature of the noncrystalline particles, placing the mix in a mold cavity which is open at one end and closed at the other end, the closed end of the cavity conforming in size and shape to the desired ultimate product, and subjecting the mix in the mold cavity to said given temperature for said given time which initially melts the noncrystalline particles and simultaneously applying pressure against the mix from the open end of the cavity to force the initially melted material and the crystalline particles carried by the melt throughout the closed end of the mold cavity and to subsequently crystallize a significant part of the melted noncrystalline material to form a hard, dense crystalline product while the pressure is maintained.

This application is a continuation-in-part application of my application Ser. No. 456,330, filed May 17, 1965, now abandoned.

My invention has as one of its most important applications the manufacture of electrical micro-circuit and integrated circuit components each comprising an insulating base carrying electrical circuitry sealed into the base and exposed conductors or leads extending from the electrical components sealed within the insulating base electrically to connect the circuitry to circuit elements external to the unit involved. In its broadest aspects my invention is useful in applications where the insulating material is an amorphous ceramc material like glass, but the more specific and important application of the invention is where the article involved is to be made of a crystalline ceramic material having close dimension tolerances. Moreover, my present invention is particularly useful where the article involved has metallic parts, such as electrical leads or conductors, embedded therein and preferably extending to the outside thereof through hermetically sealed openings.

A conventional way of making crystalline ceramic parts is to first form a powdery mixture of the ceramic materials involved, a binder like wax, and sometimes a small amount of glass (like 2 or 3%). The powdery mix is placed in an expensive steel mold where the powdery mixture is placed under an extremely high pressure to form a solid self-sustaining article of the desired shape.

The formed article is then removed from the mold, the wax binder holding the compressed ceramic particles together so the article retains its shape, and is then placed in a furnace where it is subjected to very high temperatures which effects the vaporization of the binder material and the sintering of the ceramic particles to form a relatively dense, solid mass having the general shape desired. One of the disadvantages of this prior technique is that shrinkage in the sintering process, which is as much as 10% or more, results in a product which cannot be made to precise dimensions without machining. Another disadvantage of this technique is that the temperatures required for sintering the ceramic particles are in excess of the melting temperatures of most metals, such as copper and aluminum, so that such metal parts cannot be readily incorporated into the ceramic articles involved until after the firing thereof. Such metal parts are usually attached by sandwiching them between separate preformed ceramic pieces which are, in turn, held together by an adhesive or glass frit bonded between the metal and ceramic parts. Manifestly, such a fabrication technique is time consuming and costly. The making of integrated or micro-circuit components with lead wires extending through hermetically sealed openings in ceramic insulating bases pose particularly complex problems using the techniques of the prior art because of the difficulty of obtaining the desired seal between the ceramic and metal parts involved.

It is, accordingly, one of the objects of the invention to provide a simplified and less costly method of making ceramic articles, such as support bases for electrical circuit components, having metal parts embedded therein, such as leads or terminals extending through sealed openings in the ceramic material involved. A related object is to make ceramic articles as just described where the ceramic is a rugged, refractory, ceramic material.

Still another object of the invention is to provide a new method for making crystalline ceramic articles to precise dimensions without requirement of any machining operations on the same. A related object of the present invention is to provide a method of making molded crystalline ceramic articles which method does not require the very large pressures required in the techniques heretofore practiced, so that inexpensive carbon molds or the like can be used.

Another object of the invention is to provide a method of molding a crystalline ceramic body to almost any desired shape and dimension, and with or without metal parts embedded in and extending therefrom, by a very simple process which involves the placing of a crystalline ceramic mix into a mold cavity containing the metal or other parts, if any, to be used on placing the mold in a furnace and for a relatively short period (like an hour or so) subjecting the materials in the mold to temperatures well below the sintering temperature of the crystalline ceramic and the melting temperature of the embedded parts, the completed article being obtained upon the removal of the contents of the mold.

Where a crystalline ceramic article is involved, my invention most preferably starts with the preparation of a mix of crystalline ceramic particles having a relatively high sintering temperature, and relatively low melting point amorphous ceramic particles, such as glass, the amorphous particles being in substantial amounts. The mix, which may also include a binder, for example wax particles, is preferably pressed into a wafer having a cross section corresponding to that of the mold cavity into which it is to be placed, and then visque fired to vaporize the binder and soften the amorphous ceramic particles therein which act at this point as a binder for the crystalline ceramic particles. The ceramic particles of the mix are most advantageously of very small size, such as 10 microns or less.

The pre-formed mix is then placed in a mold cavity, which may be formed of an inexpensive carbon mold, the cavity having an open end into which the pre-formed mix is placed, and a closed end which conforms to the shape of the desired product. For best results, the mold cavity and the opening thereof have substantially the same constant transverse cross sectional dimensions, but this is not mandatory for the operation of my invention. Where metal parts are to be incorporated into the ceramic product, the mold includes openings, recesses or spaces which receive the metal part to be molded with the ceramic article involved. A pressure applying plunger or head is then placed into the mold cavity which bears against the pre-formed ceramic wafer. The weight of the plunger upon the wafer may be all the pressure that is required in the molding process now being described. The filled mold with the plunger therein is placed in a furnace and heated to a temperature to melt the low melting point ceramic material which then flows and carries the crystalline particles with it throughout the mold. The plunger follows the flowing ceramic body to maintain pressure on the same so that the mix fills the closed end of the mold cavity and intimately surrounds the metal parts within the mold cavity.

The mix in the mold cavity is subjected to the pressures and temperature conditions referred to for a sufficient period to enable a phase change to take place in a significant part of the melted amorphous ceramic particles (e.g. 10% or more) which converts the same into a hard crystalline state which gives the mass a hard, dense character. The hardening of the mix must not occur, however, until all the spaces in the closed end of the mold cavity are filled with the plastic ceramic mix. Also, the temperature to which the mix is subjected must be under the melting point of any metal or other parts in the mold cavity.

The particular temperature conditions used in the process vary widely depending on the particular ceramic mix, and the particular ceramic mix utilized varies with the desired ultimate characteristic of the ceramic product, the melting point of any metal or other parts thereof embedded in the ceramic article and the mold configuration (which affects the time it takes the plastic mix to fill the closed end of the mold cavity). It is usually desirable to minimize the time it takes the plastic mix to fill the mold and this is the main reason it is preferred to utilize a mold cavity with an even cross section similar to that of the article being made, and a pre-formed ceramic wafer which has a cross section which corresponds to that of the mold cavity.

The speed at which the ceramic mix hardens into a dense solid body increases with the temperature applied thereto and the percentage of the crystalline ceramic particles in the mix which "seed" the melted amorphous particles of the mix and enhance the hardening process. (Without the presence of the crystalline ceramic particles, the temperature required for the crystallization process would be excessive.) The temperature utilized in the process and the percentage of the crystalline ceramic used in the mix must, therefore, be kept sufficiently low that the melted amorphous ceramic material will not harden before the mix fills all the spaces in the closed end of the mold cavity and any other parts present will not sinter or melt. The mold must be heated for a sufficiently long enough period to effect the desired amount of crystallization of the amorphous ceramic material but not too long to make the process inefficient. Insufficient crystallization will produce a weak fragile product that will not stand high temperatures, that is a product resembling glass, rather than a crystalline ceramic material. The high density of the desired resultant product is achieved as a result of the modest pressure applied during the molding process and the fineness of the ceramic particles of the mix.

Where metal parts are to be embedded in the ceramic article involved, it is desirable that the metal and the ceramic-glass mix be selected so that the coefficients of expansion thereof are comparable. The process of the invention provides a hermetically sealed interface between the ceramic product and the metal involved. The bond between the metal and the ceramic material is enhanced when the metal parts have smooth and even oxide films thereon. To avoid the build up of a thick uneven and flaky oxide film on the metal parts during the firing operation which would prevent the formation of a hermetic seal between the ceramic and metal parts of the article, the firing operation is preferably carried out in a controlled atmosphere. For example, an atmosphere comprising 72% nitrogen, 0.5% oxygen, 10% hydrogen and the balance carbon dioxide was found to be satisfactory.

As previously indicated, certain aspects of the present invention are applicable to the manufacture of molded amorphous ceramic (such as glass) articles having metal or other parts embedded therein or extending therethrough. Accordingly, in accordance with this aspect of the invention, the mold cavity is provided with suitable openings or spaces for holding the parts involved, a wafer of glass is placed within the mold cavity and subjected to pressure and temperature conditions which melt and force the amorphous ceramic material throughout the closed end of the mold cavity. The melted material is then cooled while the pressure is maintained within the cavity to produce the desired article.

Reference should now be made to the drawings which illustrate a few examples of the present invention.

FIG. 1 illustrates a circuit component with planar leads which readily can be made by the process of the present invention;

FIG. 2 is a longitudinal sectional view through the circuit component of FIG. 1;

FIG. 3 illustrates a wafer of ceramic material which is used to fabricate the lead frame-carrying base portion of the circuit component housing shown in FIG. 1;

FIG. 4 is a plan view of the lead frame which is integrated with the base portion of the component housing in the exemplary process of the present invention;

FIG. 5 is a sectional view through a mold assembly which receives the lead frame of FIG. 4 and the ceramic wafer of FIG. 3;

FIG. 6 is a bottom plan view of the upper unit of the mold assembly shown in the FIG. 5 embodiment;

FIG. 7 is a fragmentary sectional view through the upper mold unit shown in FIG. 6, taken along section lines 7—7 therein;

FIG. 8 is a perspective view of a circuit component having transversely extending plug-in leads and which can be readily made by the process of the present invention;

FIG. 9 is a sectional view through the circuit component of FIG. 8, taken along section lines 9—9 therein;

FIG. 10 is a sectional view through a mold assembly used to make the lead frame-carrying base portion of the component shown in FIG. 8, the mold having wires or rods inserted therein which are to form the leads of the circuit component shown in FIG. 8;

FIG. 10A is a highly enlarged view of a portion of the mold assembly shown in FIG. 10 which receive the lead-forming wires or rods;

FIG. 11 is a view of the mold assembly shown in FIG. 9 with the ceramic wafer of FIG. 3 positioned therein; and FIG. 12 is a sectional view through the mold assembly of FIG. 11 after the ceramic wafer has been subjected to a temperature and pressure which forms a complete molded ceramic base with the lead-forming wires or rods incorporated therein.

Referring now to FIGS. 1 and 2, the electrical circuit component there shown and generally indicated by reference numeral 2 includes a housing 4 having a hermetically sealed compartment 6 with various circuit components contained therein, and a lead frame 8 having a series of planar leads 10 extending from opposite sides of the housing. The inner ends of the leads 10 extending within the housing 4 are spaced apart and extend to terminals of various circuit elements within the housing compartment 6. The outer ends of the leads 10 are connected to a peripheral frame portion 8' which gives strength and rigidity to the lead frame to prevent bending of the leads 10 during transport and handling of the same prior to being incorporated in a piece of electrical equipment. The outer ends of the leads 10 are, therefore, severed from the peripheral frame portion 12 of the lead frame at the location where the electrical component involved is incorporated into such electrical equipment.

The housing 4 includes a base portion 4a made of a ceramic insulating material to which the lead frame 8 is integrally connected during the practice of the process of the present invention, and a cover portion 4b which may be made of the same insulating material as the base portion 4a or from some other material.

The primary importance of the present invention in the fabrication of the circuit component shown in FIGS. 1 and 2 is that it enables the insulating base 4a to be made to precise dimensions and integrated through hermetic seals with the lead frame in an extremely simple and inexpensive manner.

As previously indicated, the present invention is broadly applicable to the manufacture of ceramic articles of all kinds, including glass articles or crystalline ceramic articles. In either event, it is preferred that the ceramic material which ultimately forms the base portion 4a of the housing 4 is initially in the form of a ceramic wafer 14 which has a transverse cross section approximately corresponding to that of the housing base. Where the ceramic article is to be made of glass, the wafer could be a solid plate of glass cut to size but it is much more convenient to form the glass wafer to size by pressing fine glass particles with a wax binder in a mold and then visque firing the same to drive off the wax binder and often the glass particles which then bond themselves together. In the case where the article is to be a crystalline ceramic article, the wafer 14, as previously explained, comprises a fine mix of a substantial quantity of glass particles and crystalline ceramic particles.

In one example of the latter embodiment of the invention, the fabrication procedure for making the wafer 14 was as follows: A thick distilled water slurry was formed of about ⅔ part by weight of alumina, about 3 parts by weight of borosilicate glass and about 4/10 part by weight of wax. The mixture was ball milled to produce fine particles of alumina, borosilicate glass and wax. (Manifestly, glass and crystalline ceramic materials other than alumina and borosilicate could be used.) As indicated previously, the size of the particles desired by the ball milling operation was 10 microns or less. The ball milled mixture was warmed over a low heat to boil off the distilled water but not warm enough to boil off the wax. After the mix was thoroughly dry, the material was screened through a 600 mesh screen to ensure the obtainment of only fine particles. The dried material was then pressed into a mold shaped to produce the wafer 14, the wax particles of the mix acting as a binder to maintain the shape of the wafer. The wafer was then visque fired at about 1300 degrees Fahrenheit to vaporize the wax particles and to soften the glass particles a bit which act at this point as a binder for the ceramic particles. The borosilicate glass particles of the mix have a relatively low melting point relative to the sintering and melting temperatures of the alumina.

In the case where the wafer 14 is to be made wholly of glass, the wafer 14 may be formed of borosilicate glass particles by a similar technique to that just described. In one example, glass particles were much larger than the particles in the glass-crystalline ceramic mix described. Thus, the dried glass and wax particles which were placed in the wafer forming mold were passed through an 80 to 150 mesh screen.

FIG. 4 illustrates one section 8-1 of a lead frame strip of which section 8-1 forms a part. The lead frame thus comprises a number of lead frame sections like that shown in FIG. 4, the number depending upon how many insulating bases it is desired to make in a single molding operation. The mold unit to be used thus has a number of mold sections, one of which is shown in FIG. 5, equal to the number of lead frame sections. Each section of the lead frame has a pair of opposite end leg portions 8a—8a and a pair of opposite side leg portions 8b—8b. The opposite end leg portions 8a—8a of each frame section has a pair of positioning holes 17—17 through which extends a pair of positioning pins 19—19 for precisely locating the lead frame section involved between a pair of mold parts 20-20' forming a mold assembly shown in FIG. 5. The pins 19-19 extend through corresponding bores 21-21' formed in the mold parts 20-20'.

In the most preferred form of the invention, the mold part 20 is positioned above the mold part 20' and the mold part 20 has a mold cavity 23 for each insulating base to be fabricated thereon. Although, in accordance with the broadest aspects of the invention, each mold cavity 23 can have any size or shape, it is preferred that it have a transverse cross section corresponding to the profile of the outer margins of the insulating base to be fabricated. The illustrated mold cavity 23 is shown as having a consistent rectangular transverse cross section which opens at the top thereof for the full extent of its cross section. The bottom end of the mold cavity 23 is completely closed off by the bottom mold part 20' and the leads 10 of the lead frame 8, which leads fit snugly within correspondingly shaped and sized recesses 24 in the bottom face (see FIGS. 6 and 7) of the mold part 20. Recesses are also formed in the bottom face of the mold part 20 which recesses receive the legs 8a—8a and 8b—8b of the lead frame section involved.

The exemplary process of the present invention being described involves the application of pressure and temperature to the wafer 14 and the lead frame 4 when positioned in a superimposed relation in a mold. Accordingly, after the mold has been assembled as shown in FIG. 5, a wafer 14, which preferably conforms to the size of the cavity 23, is dropped in each of the mold cavities of the mold assembly, and, in the most preferred form of the invention, a plunger unit 25 is brought into position above the mold assembly. The plunger unit 25 has a series of plunger rods 25a extending from the bottom surface thereof, one such plunger rod overlying and conforming in size and shape to the mold cavity which it overlies. The plunger unit 25 forms a weight which bears down upon the top of the wafers 14 through the medium of the plunger rods 25a.

The entire mold assembly with the plunger unit 25 supported thereon is placed into a furnace (not shown) where, as above explained, it is subjected to a temperature which first melts the glass particles of the wafers 14 to cause free flow of the ceramic material throughout the closed ends of the mold cavities and intimately around the edges of the leads 10 exposed therein. The volume of each wafer 14 is manifestly adjusted so that there is just sufficient material to fill that portion of the associated mold cavity defining the margins of the desired ultimate product. As the melted material of each wafer 14 flows in the mold cavity involved, the pressure applied by the associated plunger rod is maintained thereon as the plunger rod 25a drops by its own weight with the level of the ceramic material in the mold cavity. It should be apparent that only modest pressures are applied to the mold parts in the process of the invention being described and so the mold parts 20 and 20' can be made of inexpensive materials, such as carbon. For example, in one case where the mold cavity 23 was one inch square, the weight exerted by the plunger unit 25 upon the wafer 14 in each cavity was only two pounds, so that the pressure involved was only two pounds per square inch.

In the embodiment of the present invention where the wafer 14 comprises a mixture of glass and crystalline ceramic particles, the conditions of the furnace are such that the melted glass becomes highly fluid and carries the crystalline ceramic particles with it throughout the closed end of the mold cavity 23 before the melted glass particles crystallize to a point where the free flowing qualities thereof terminate and the hard, dense, primarily crystalline ceramic product develops. Also, the temperature utilized must be below the melting temperature of the lead frame 8, which may be of copper, aluminum or other suitable metal. With the exemplary glass-ceramic wafer described above, the mold was subjected to a temperature of 1725 degrees Fahrenheit for about 45 minutes. As previously indicated, the atmosphere of the furnace is closely controlled so that flaking or uneven build up of oxide coatings on the leads 10 does not occur to ensure a sealed interface between the ceramic and metal surfaces. The plunger unit remains in place on the mold until the final hard insulating bases are formed in the mold cavities.

After the firing operation, the contents of the mold unit are allowed to cool gradually before they are removed from the mold cavities. The completed article removed from each mold cavity 23 in the example of the invention now being described was a body of 45% by volume of crystalline material forming a flat insulating base 4a having embedded in one of the surfaces thereof the leads 10 which are flush with the latter surface which forms a support base for one or more elements 29 (FIG. 2) which are soldered or otherwise electrically connected to the inner ends of the leads 10. A cover member 4b' is then placed over the support surface containing the circuit elements and bonded to the insulating base. The cover member may be made by a molding operation like that just described in connection with the fabrication of the insulating base 4a, and the bond between the cover member and the insulating base may be effected in a number of well known ways, such as by use of epoxy adhesives or by melting glass frit placed between the cover member and the insulating base.

Reference should now be made to FIGS. 8 and 9 which illustrate another electrical circuit component 30 to which the process of the invention is applicable. The circuit component 30 comprises a hermetically sealed housing 32 having an insulating base 32a defining a compartment 33 in the upper portion thereof, and a cover 32b. A printed circuit board 35 is supported in the compartment 33 and the terminals thereof make suitable electrical contact with the upper ends of the conductors or pins 34 extending from the insulating base and forming plug connectors for the circuit component 30. The insulating base 32a and the connector pins 34 are integrated into a hermetically sealed unit by a process similar to that above described in the fabrication of the insulating base 4a and the integrated lead frame 8 in the circuit component 2.

The mold 36 for fabricating the circuit component 30 is shown in FIGS. 10 through 12 and comprises a mold body having a number of mold cavities 38 preferably formed in the upper surface thereof corresponding to the number of insulating bases to be made in a single firing operation. Where each insulating base 32a is to have a rectangular shape as indicated, each mold cavity 38 has a correspondingly shaped transverse cross section. The bottom wall 40 of each mold cavity 38 is provided with a number of sockets 42 positioned alcording to the desired positions of the various pin connectors 34. A pin 34 is snugly supported in each of the sockets 42 in the mold body 36, and the upper end of each connector pin 34 projects into the mold cavity 38 by the same distance that the connectors pins 34 are to extend into the insulating base 32a.

A wafer 14, having outer dimensions preferably corresponding to the transverse cross section of the mold cavity 38, is placed in each mold cavity 38 so that the wafer sits upon the upper portions of the pins 34. A plunger unit 25' is brought into position above the mold body 36, the plunger unit 25' having plunger rods 25a' extending from the bottom surface thereof positioned and shaped to fit into the mold cavities 38 of the mold body 36. As shown in FIG. 9, the upper surface of each insulating base 32a illustrated therein has an uppermost peripheral edge 43a, a cover member seating shoulder 43b positioned below the inner margins of the ledge 43a a distance equal to the thickness of the cover member 32b and the bottommost wall 40 which defines the bottom surface of the housing compartment 33 which contains the printed circuit board 35.

The bottom surface of each of the plunger rods 25a has corresponding surfaces 44a for forming the peripheral edge 43a of the insulating base 32a, a surface 44b for forming the cover member seating shoulder 43b of the insulating base, and a surface 44c for forming the bottom surface 40 of the housing compartment 33.

When the mold body 36 with the plunger unit 25' is freely supported thereon, it is placed in a furnace and subjected to the temperature conditions described above. It will be seen that the glass particles of each wafer 14 will flow into the bottom end of the associated mold cavity 38 and intimately surround the surfaces of the connector pins 34 projecting up into the mold cavity. The upper portions of the connector pins 34 may terminate flush with the surface 40 of the insulating base or they may extend above the level thereof depending upon the nature of the desired connections between the printed circuit board 35 and the connector pins 34.

Each cover member 32b may be formed by a molding process like that just described, and may be bonded to the insulating base 32a in any suitable manner well known in the art. Each printed circuit board 35 may be secured to the bottom of the cover member 32b or it may be supported within the housing by the soldering of the terminals thereof to the connector pins 34.

It is apparent that the present invention provides an especially simple and inexpensive method for molding to precise dimensions ceramic articles with or without metal parts embedded therein. It should be understood that numerous modifications may be made in the most preferred forms of the invention described above without deviating from the broader aspects described above.

I claim:

1. A method of making a molded ceramic body comprising the steps of: forming a mix of crystalline ceramic particles having a relatively high sintering and melting temperature and relatively low melting point non-crystalline particles convertible into a crystalline state when heated for a given time to a given temperature below the sintering and melting temperatuers of the crystalline ceramic particles and above the melting temperature of the non-crystalline particles; placing the mix in a mold cavity which is open at one end and closed at the other end, the closed end of the cavity conforming in size and shape to the desired ultimate product; and subjecting the mix in the mold cavity to said given temperature for said given time which initially melts the non-crystalline particles and simultaneously applying pressure against the mix from the open end of the cavity to force the initially melted material and the crystalline particles carried by the melt throughout the closed end of the mold cavity and to subsequently crystallize a significant part of the melted non-crystalline material to form a hard, dense crystalline product while the pressure is maintained.

2. The method of claim 1 wherein said crystalline and non-crystalline particles have a particle size no greater than about 10 microns.

3. The method of claim 1 wherein said mold cavity has a consistent transverse cross section for most of its length and an opening which is open for the full cross section of said mold cavity cross section, said mix of crystalline and non-crystalline particles being a pre-formed wafer sized and shaped like said mold cavity cross section, and said pressure applied to said mix in the mold cavity effected by a plunger conforming to said mold cavity cross section and pushing on the side of the wafer facing said mold cavity opening.

4. The method of claim 1 wherein the molded ceramic body is to incorporate at least one embedded part whose melting temperature is above said given temperature and which is to extend to the surface of the body and wherein the interface between the body surface and the part is to be air-tight, the method further including the step of placing said part in said closed end of the mold cavity so it extends to a margin of the mold cavity before said mix of crystalline and non-crystalline particles is caused to flow therein whereby the mix is forced into intimate sealing contact with said part.

5. The method of claim 1 wherein the molded ceramic body is to incorporate at least one embedded part whose melting temperature is above said given temperature, the method further including the step of placing said part in said closed end of the mold cavity before said mix of crystalline and non-crystalline particles is caused to flow therein, whereby the mix is forced into intimate sealing contact with said part.

6. The method of claim 5 wherein said part has a metal surface with a smooth oxide coating thereon, and the heating of the mix in the mold cavity is carried out in a controlled atmosphere which ensures the maintenance of the smooth oxide coating on said metal part.

7. A method of making a molded ceramic body comprising: forming a mixture of fine crystalline ceramic particles having a relatively high sintering and melting temperature, fine relatively low melting point particles and a binder, said glass particles being convertible into a crystalline state when heated for a time to a given temperature below the sintering and melting temperature of the crystalline ceramic particles and above the melting temperature of the glass particles; pressing the mixture into a body sized to fit into the open end of a mold cavity and simultaneously heating the pressed body to a temperature which drives off the binder and softens the glass particle which then acts as a binder which retains the shape of the pressed body; placing the resultant pressed body in a mold cavity which is open at one end and closed at the other end, the closed end of the cavity conforming in size and shape to the desired ultimate product; and subjecting the pressed body in the mold cavity to said given temperature which initially melts the glass particles and simultaneously applying pressure against the pressed body from the open end of the cavity to force the initially melted material and the crystalline particles carried by the melt throughout the closed end of the mold cavity and to subsequently crystallize at least part of the melted non-crystalline material to form a hard, dense crystalline product.

References Cited

UNITED STATES PATENTS

| 3,077,658 | 2/1963 | Wharton | 29—627 X |
| 3,117,174 | 1/1964 | Hessinger et al. | 264—272 X |
| 3,199,003 | 3/1965 | Turner. | |
| 3,262,022 | 7/1966 | Caracciolo. | |

WILLIAM I. BROOKS, *Primary Examiner.*

U.S. Cl. X.R.

29—627, 624; 264—61, 332